United States Patent
Kobayashi

(10) Patent No.: US 8,848,217 B2
(45) Date of Patent: Sep. 30, 2014

(54) COMPUTER PROGRAM PRODUCT, INFORMATION PROCESSING APPARATUS, PRINTER, AND SYSTEM

(75) Inventor: Hiroto Kobayashi, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1017 days.

(21) Appl. No.: 12/801,063

(22) Filed: May 20, 2010

(65) Prior Publication Data
US 2010/0302589 A1 Dec. 2, 2010

(30) Foreign Application Priority Data
Jun. 1, 2009 (JP) ................................. 2009-132450

(51) Int. Cl.
*G06F 3/12* (2006.01)
(52) U.S. Cl.
CPC ............ *G06F 3/1203* (2013.01); *G06F 3/1225* (2013.01)
USPC ........ 358/1.15; 358/1.13; 358/1.16; 719/321; 709/201; 709/220
(58) Field of Classification Search
None
See application file for complete search history.

(56) References Cited

U.S. PATENT DOCUMENTS

| | | | |
|---|---|---|---|
| 6,268,927 B1 * | 7/2001 | Lo et al. | 358/1.15 |
| 6,967,728 B1 * | 11/2005 | Vidyanand | 358/1.12 |
| 7,284,246 B2 * | 10/2007 | Kemp et al. | 719/321 |
| 7,610,349 B1 * | 10/2009 | Swinton et al. | 709/216 |

FOREIGN PATENT DOCUMENTS

| | | |
|---|---|---|
| JP | 2005-208895 | 8/2005 |
| JP | 2006-260354 | 9/2006 |

* cited by examiner

*Primary Examiner* — Ashish K Thomas
(74) *Attorney, Agent, or Firm* — Harness, Dickey & Pierce, P.L.C.

(57) ABSTRACT

A set of files making up a plug-in that is to be added to a base printer driver is stored all together in a single plug-in storage file. While no plug-in is added, the plug-in storage file is kept empty. A file making up the printer driver and the plug-in storage file are included as printer driver configuration files, and are described in a file list in a driver information file. When the printer driver is copied to a client computer, the files making up the printer driver and the plug-in storage file are transferred, following the descriptions in the file list.

10 Claims, 11 Drawing Sheets

FIG. 7

```
[Version]
Signature  = "XXXX"
Provider   = YYYY
ClassGUID  = {45678901-EEEE-1111-1111-000000000008}
Class      = Printer
DriverVer  = 03/14/2009,1.0.0.0
CatalogFile = rplgprn.cat

[Manufacturer]
YYYY = PRINTERS

;ZZZZ(x86)
[PRINTERS]
XXXX Driver = drv.dat,USBPRINT\XXXXPRINTER_12345

[drv.dat]
CopyFiles          = MODULES
DataSection        = REGIST_DRIVER
DataFile           = rplgprn.dat

[MODULES]
rplgprnui.dll
rplgprngr.dll
rplgprn.dat
rplgprn.ini
rplgprn.xml
rplgprn.chm
rplgprn.zip

[REGIST_DRIVER]
ConfigFile         = rplgprnui.dll
DriverFile         = rplgprngr.dll
HelpFile           = rplgprn.chm

[DestinationDirs]
DefaultDestDir = 66000

[SourceDisksNames.x86]
1 = XXXX Driver Disk1,,

[SourceDisksFiles.x86]
rplgprnui.dll                = 1
rplgprngr.dll                = 1
rplgprn.dat                  = 1
rplgprn.ini                  = 1
rplgprn.xml                  = 1
rplgprn.chm                  = 1
rplgprn.zip                  = 1
```

```
[Version]
Signature    = "XXXX"
Provider     = YYYY
ClassGUID    = {45678901-EEEE-1111-1111-00000000000008}
Class        = Printer
DriverVer    = 03/14/2009,1.0.0.0
CatalogFile  = rplgprn.cat

[Manufacturer]
YYYY = PRINTERS

;XXXX(x86)
[PRINTERS]
YYYY Driver = drv.dat,USBPRINT\YYYYPRINTER_12345

[drv.dat]
CopyFiles        = MODULES
DataSection      = REGIST_DRIVER
DataFile         = rplgprn.dat

[MODULES]
rplgprnui.dll
rplgprngr.dll
rplgprn.dat      } 211
rplgprn.ini
rplgprn.xml
rplgprn.chm

[REGIST_DRIVER]
ConfigFile       = rplgprnui.dll
DriverFile       = rplgprngr.dll
HelpFile         = rplgprn.chm

[DestinationDirs]
DefaultDestDir = 66000

[SourceDisksNames.x86]
1 = YYYY Driver Disk1,,

[SourceDisksFiles.x86]
rplgprnui.dll             = 1
rplgprngr.dll             = 1
rplgprn.dat               = 1
rplgprn.ini               = 1
rplgprn.xml               = 1
rplgprn.chm               = 1
```

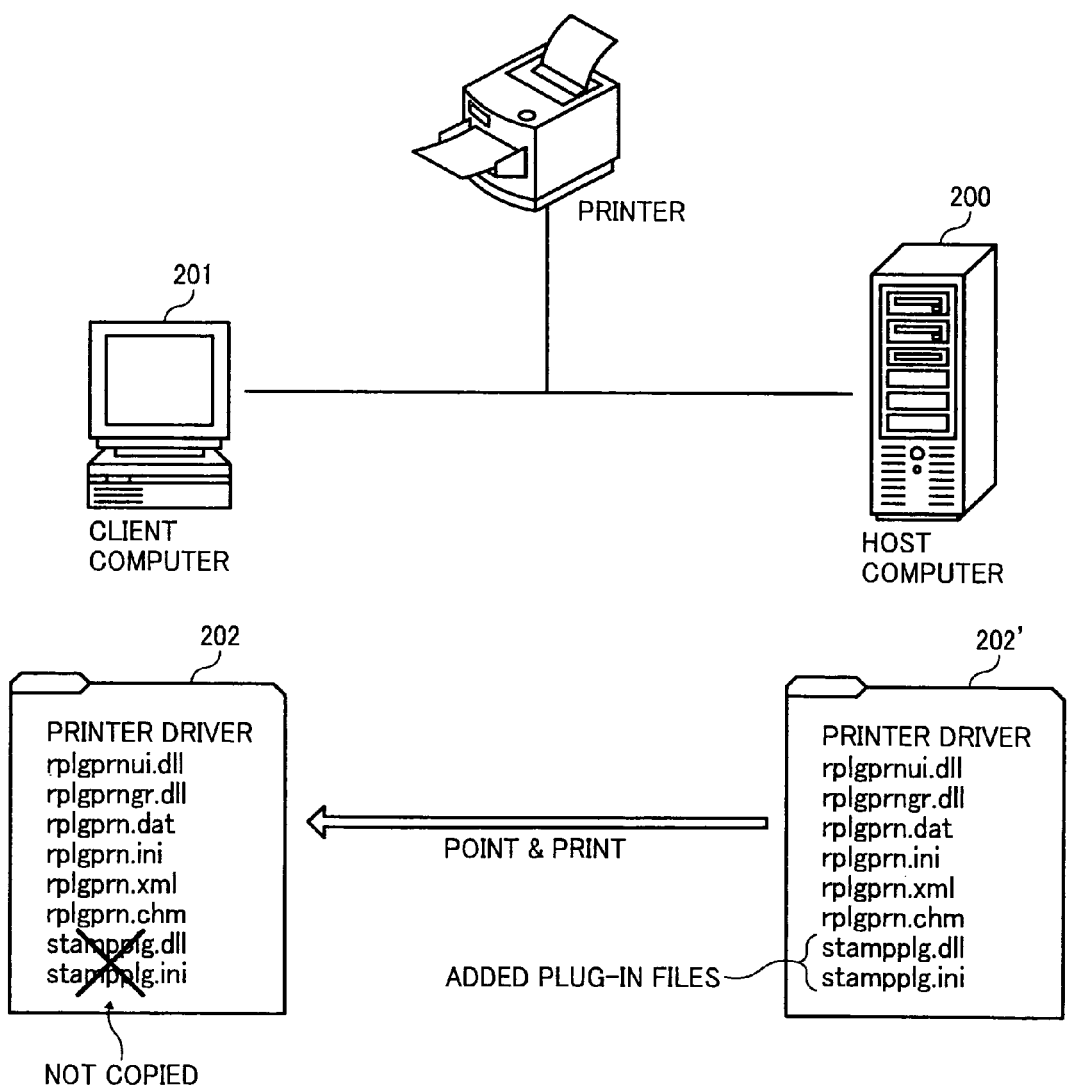

COMPUTER PROGRAM PRODUCT, INFORMATION PROCESSING APPARATUS, PRINTER, AND SYSTEM

CROSS-REFERENCE TO RELATED APPLICATIONS

The present application claims priority to and incorporates by reference the entire contents of Japanese Patent Application No. 2009-132450 filed in Japan on Jun. 1, 2009.

BACKGROUND OF THE INVENTION

1. Field of the Invention

The present invention relates to a computer program product, an information processing apparatus, a printer, and a system for adding a printer operation controlling function to a printer driver.

2. Description of the Related Art

A system in which a host computer, a client computer, a printer, and the alike are connected to a network such as a local area network (LAN) has been conventionally known. In such a system, the client computer uses the host computer as a print server, and can cause the host computer to execute a print over the network.

In such a system, a printer driver corresponding to the printer needs to be installed on each of the host computer and the client computer. In a scenario where a number of client computers executing prints using the printer are connected to the network, a work of installing the printer driver to each of the client computer requires a high cost.

Therefore, a mechanism for allowing the printer driver to be easily installed to the client computer has conventionally been provided. For example, in the Windows (registered trademark) that is an operating system (OS) developed by Microsoft Corporation in the United States, such a mechanism is provided as a function referred to as "Point & Print".

In the "Point & Print" function, when a shared printer on the host computer is selected using an application programming interface (API) on the client computer, the client computer and the host computer exchange information about functions of the selected shared printer, information about an OS on the client computer, and the like. The host computer then selects a printer driver based on the information obtained by way of the exchange, and transfers a set of files that makes up the selected printer driver to the client computer over the network. The client computer copies the set of files making up the printer driver and transferred over the network to a predetermined folder, for example, registers the same to the OS, and installs the same. In this manner, the client computer becomes able to cause the shared printer connected over the network to print.

A mechanism called a plug-in for allowing an additional function to be attached or removed freely to a base program is widely known. By incorporating plug-in software for adding a predetermined function into application software, the function not included in the application software by default or a more advanced function becomes available.

Recently, the number of examples in which not only in general application software but also a printer driver includes such a plug-in mechanism has been increasing. By allowing a printer driver to have the plug-in mechanism, a printing function for the printer can be added or removed easily without upgrading the printer driver itself.

Let us now consider a scenario in which the plug-in mechanism is used in the system in which the host computer, the client computer, and the printer are connected over the network. In this scenario, to utilize the function of the plug-in software installed in the host computer on the client computer, the same plug-in software installed in the host computer needs to be installed on the client computer.

Japanese Patent Application Laid-open No. 2005-208895 discloses an installer that manages an addition and a removal of plug-in software to printer driver that has been installed on a host computer, as well as that manages an addition and a removal of the plug-in software to a client computer connected to the host computer over the network.

According to Japanese Patent Application Laid-open No. 2005-208895, upon adding plug-in software to the printer driver on the host computer, the installer makes a copy of the plug-in software to be added to a predetermined directory for installing the printer driver on the host computer. At the same time, the installer temporarily stops the printing queue on the host computer, and restarts the printing service.

The host computer then notifies to each of the client computer that the plug-in software has been added, and the host computer transfers the files of the added plug-in software to each of the client computers.

The installer also operates on the client computer to make a copy of the plug-in software files that is to be added and has been transferred over the network to a predetermined directory for installing the printer driver on the client computer.

However, in the printer driver having a conventional plug-in mechanism, it has been difficult to cause the plug-in software to be installed automatically.

This point will be explained using the example of the "Point & Print" function. In the "Point & Print", only the files specified in a driver information file (inf file) 210, as an example illustrated in FIG. 13, describing configuration information of the printer driver are downloaded and copied from the host computer to the client computer. In the example illustrated in FIG. 13, a list of the files making up the printer driver is described in a file list section 211 in the driver information file 210.

The driver information file 210 is used when the printer driver is installed, and describes therein configuration information of a package of the printer driver, that is, information such as the names of the files making up the printer driver and an installing directory. In other words, as the example in FIG. 14 indicates, when a printer driver 202 is copied from a host computer 200 to a client computer 201, the host computer 200 refers to the descriptions in the driver information file 210 to select files that are to be transferred to the client computer 201. The OS manages the configuration information described in the driver information file 210 until the printer driver is uninstalled.

The plug-in software extends the functions of the printer driver that is already installed. Therefore, the configuration information of the plug-in software, such as the names of files making up the plug-in software, is not described in the driver information file 210 that is used when the printer driver is installed.

Even if the printer driver has the plug-in mechanism, the printer driver cannot change the configuration information managed by the OS. In other words, the printer driver cannot change the contents of the driver information file 210. Therefore, the plug-in software files that are added after the printer driver 202 has been installed to the host computer 200 are not copied to the client computer 201 by way of the "Point & Print" function provided by the OS.

Therefore, as illustrated in the example in FIG. 15, even if a printer driver 202' on the host computer 200 has functions thereof extended by way of plug-in software, the package of the printer driver 202, which is the one before the function is added, is downloaded and installed to the client computer 201 following the driver information file 210.

On the contrary, Japanese Patent Application Laid-open No. 2005-208895 solves this problem by allowing the installer to manage the files that are not described in a driver information file and added as plug-in software. In other words, in Japanese Patent Application Laid-open No. 2005-208895, when the plug-in software is added to the host computer, the installer notifies the same to the client computer, and transfers the plug-in software that is added to the client computer.

However, according to Japanese Patent Application Laid-open No. 2005-208895, the plug-in software file cannot be copied to the client computer by way of the "Point & Print" function provided in the OS by default alone, and the installer that is a dedicated module that is independent from the OS needed to be used.

Furthermore, because the module that is independent from the OS is used, compatibility with the OS is sacrificed, and it would be difficult to support a version change of the OS, for example.

SUMMARY OF THE INVENTION

It is an object of the present invention to at least partially solve the problems in the conventional technology.

According to an aspect of the present invention, there is provided a computer program product including a computer-usable medium having computer-readable program codes embodied in the medium for installing a plug-in that adds a function to a printer driver. The program codes when executed causes a computer to execute storing a file that makes up a plug-in that is to be newly added to the printer driver in a plug-in storage file without changing a file name of the plug-in storage file. A file name of a file making up a main part of the printer driver and the file name of the plug-in storage file storing therein the plug-in adding a function to the main part of the printer driver are described, as file names of files making up the printer driver, in a printer driver configuration information file in advance. The printer driver configuration information file is referred by an operation system to obtain the file names of the files making up the printer driver upon copying the files making up the printer driver to a different information apparatus and installing the printer driver to the different information apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5A is a schematic depicting an exemplary configuration of a plug-in;

FIG. 5B is a schematic depicting another exemplary configuration of the plug-in;

FIG. 7 is a schematic depicting an exemplary configuration of a driver information file corresponding to the printer driver package according to the embodiment;

FIG. 13 is a schematic depicting an example of a driver information file in which configuration information for the printer driver is described;

FIG. 15 is another schematic depicting how the printer driver is copied from the host computer to the client computer according to the conventional technology.

DETAILED DESCRIPTION OF THE PREFERRED EMBODIMENTS

An embodiment of a printer driver according to the present invention will now be explained in detail with reference to the accompanying drawings. According to the present invention, a set of files making up plug-in software for adding a function to a base printer driver is stored in a single file (referred to as a plug-in storage file). When any plug-in software is not added thereto, the plug-in storage file is kept as a dummy, for example, kept empty. The files making up the base printer driver and the plug-in storage file are used as the configuration files of the printer driver, and are described in a file list that specifies a driver configuration and is included in the driver information file.

When a printer driver package is copied to the client computer, the files making up the base printer driver and the plug-in storage file are transferred from the host computer to the client computer, following the description in the driver configuration file list. Because the description in the driver configuration file list does not change depending on whether plug-in software is added, the transferring process executed upon installing the plug-in software to the client computer can be performed in the same manner as when only the base printer driver is transferred.

<System Applicable to Present Invention>

Figure 1:
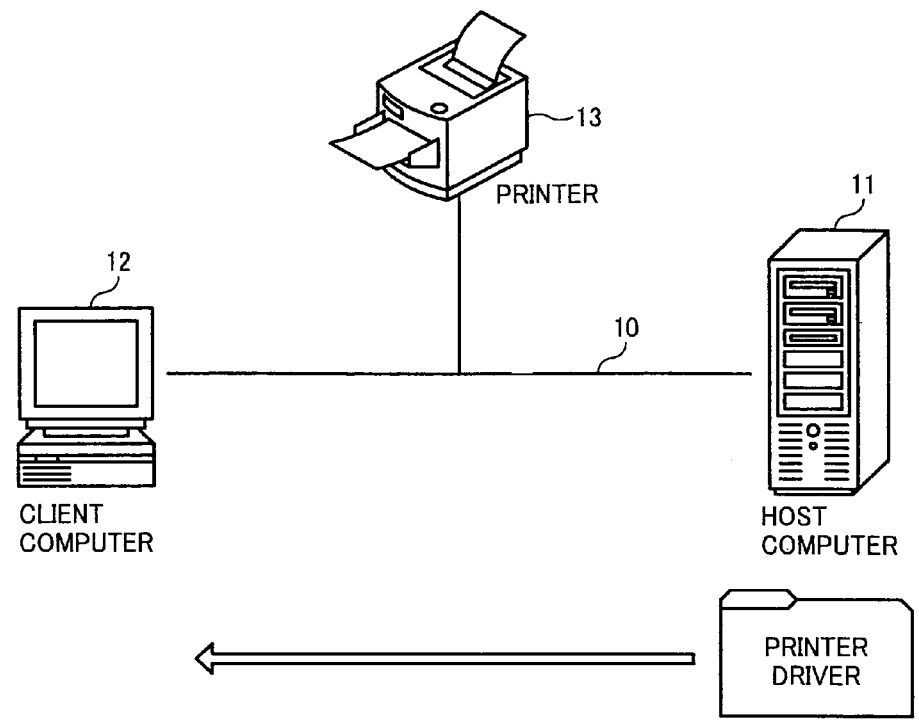
FIG. 1 is a schematic schematically depicting an example of a system configuration that is applicable to the present invention.

Before explaining an embodiment according to the present invention, a system that is applicable to the present invention will be explained. FIG. 1 schematically depicts an example of the system configuration that is applicable to the present invention. A host computer 11, a client computer 12, and a printer 13 are connected to a network 10 such as local area network (LAN). The host computer 11 has a function of a print server, and manages the printer 13. A printer driver corresponding to the printer 13 is installed in each of the host computer 11 and the client computer 12 to allow the client computer 12 to cause the printer 13 to print. Upon installing the printer driver to the client computer 12, files are downloaded from the host computer 11, in the manner to be described later.

Figure 2:
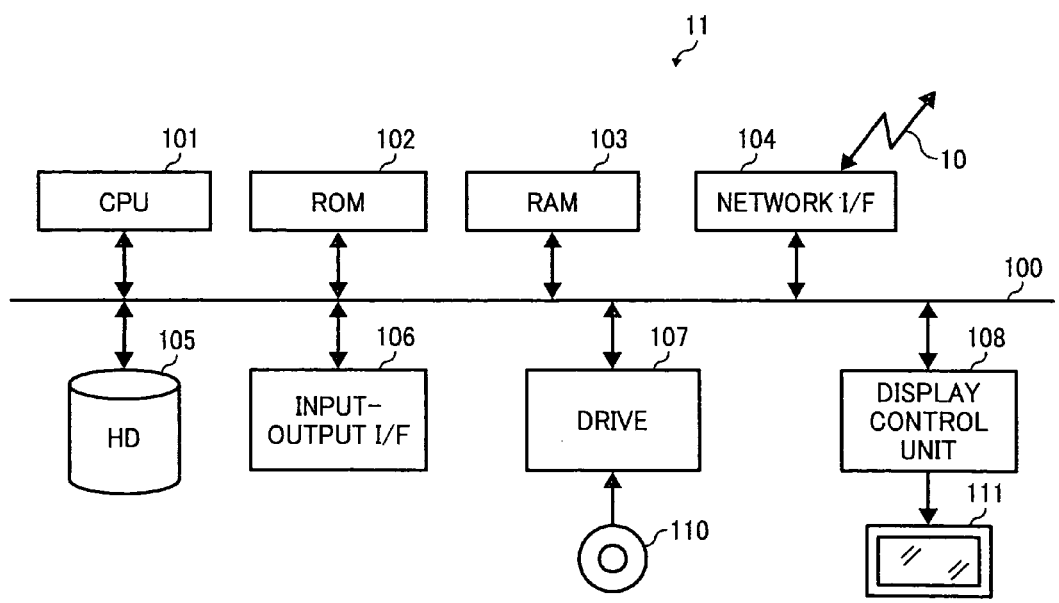
FIG. 2 is a block diagram of an exemplary configuration of a host computer.

FIG. 2 depicts an example of a configuration of the host computer 11. The client computer 12 can be realized in the same configuration as the host computer 11; therefore, the explanation of the client computer 12 is omitted herein to avoid complication. As illustrated in the example in FIG. 2, a general configuration of a computer can be applied the host computer 11 and the client computer 12.

In the host computer 11, a central processing unit (CPU) 101, a read only memory (ROM) 102, a random access memory (RAM) 103, a network interface (I/F) 104, a hard disk (HD) 105, an input-output interface (I/F) 106, a drive 107, and a display control unit 108 are connected to a bus 100. Each of these units connected to the bus 100 is configured to exchange data via the bus 100.

The CPU 101 controls overall operations of the host computer 11 following computer programs stored in the ROM 102 or the hard disk 105 in advance, and using the RAM 103 as a working memory.

The hard disk 105 stores therein the computer programs for enabling the CPU 101 to operate and various data. Examples of the computer programs stored in the hard disk 105 include an operating system (OS) that performs basic controls for the operations of the host computer 11, and a printer driver for managing and controlling the printer 13. The hard disk 105 may also temporarily store therein data generated while the CPU 101 executes the computer programs.

The input-output I/F 106 controls inputs and outputs of data to and from the host computer 11. For example, input devices such as a keyboard and a mouse are connected to the input-output I/F 106. Controlling signals corresponding to operations a user makes on these input devices are output from the input-output I/F 106 and supplied to the CPU 101 via the bus 100. The input-output I/F 106 may also support a serial interface such as the Universal Serial Bus (USE) or the Institute Electrical and Electronics Engineers (IEEE) 1394.

The drive 107 reads data from a storage medium 110 such as a compact disk (CD) or a digital versatile disk (DVD). Without a limitation thereto, a storage medium supported by the drive 107 may also be a nonvolatile semiconductor memory, for example. The computer programs for causing the CPU 101 to operate are provided stored in the CD, the DVD, and the nonvolatile semiconductor memory, for example, and are read by the drive 107 and stored in a predetermined location in the hard disk 105. The display control unit 108 is connected with a display 111, and converts and outputs a display controlling signal generated by the CPU 101 into a signal in a format displayable on the display 111.

The network I/F 104 supports the Transmission Control Protocol/Internet Protocol (TCP/IP), for example, and can communicate with an external information apparatus such as the client computer 12 or the printer 13 over the network 10. The computer programs for causing the CPU 101 to operate may be provided from an external server, for example, over the network 10, received at the network I/F 104, and stored in a predetermined location in the hard disk 105.

Figure 3:
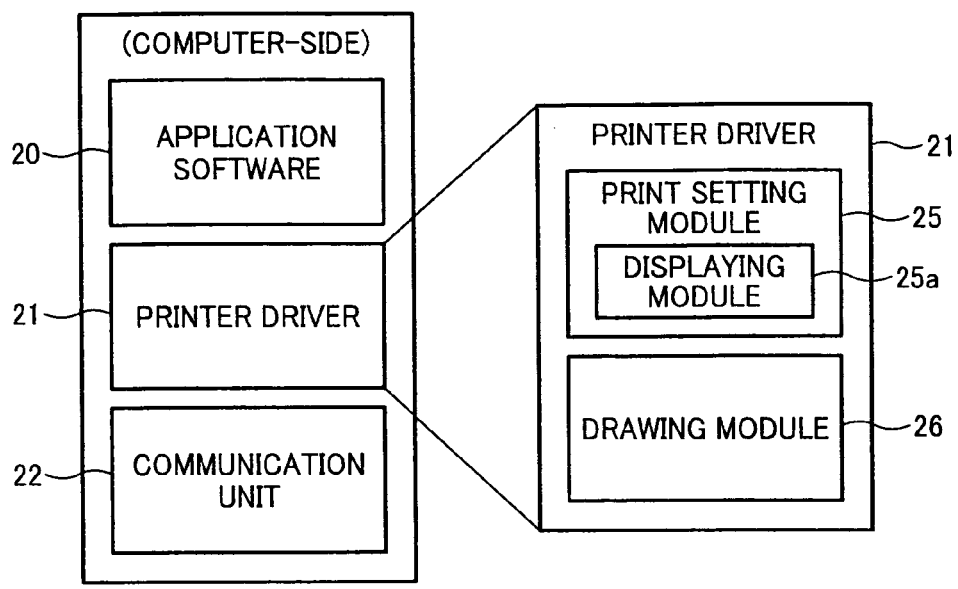
FIG. 3 is a schematic schematically depicting an example of architecture related to a printer control in a client computer.

FIG. 3 schematically depicts an example of architecture related to a printer control in the client computer 12. As illustrated in the example in FIG. 3, general architecture related to a printer control is applied to the client computer 12. The same architecture can also be applied to the host computer 11.

For example, the client computer 12 has application software 20 and a printer driver 21 installed therein, and has a communication unit 22 for communicating with the printer 13. The application software 20 is, for example, word processing software, spreadsheet software, or imaging software. The communication unit 22 includes a communication device that physically communicates with the printer 13, and software that controls the communication device.

The printer driver 21 has a print setting module 25 and a drawing module 26. In the example in FIG. 3, it is assumed that the printer driver 21 does not have any plug-in function. The print setting module 25 performs various printing-related settings based on a user operation or a command from the application software 20. A displaying module 25a causes the display 111 to display thereon print setting information, and presents the print settings to the user. The drawing module 26 converts data that the application software 20 requests to have printed into a format printable by the printer 13 according to the print settings set by the print setting module 25 to generate drawing data. The drawing data is passed to the communication unit 22.

Figure 4:
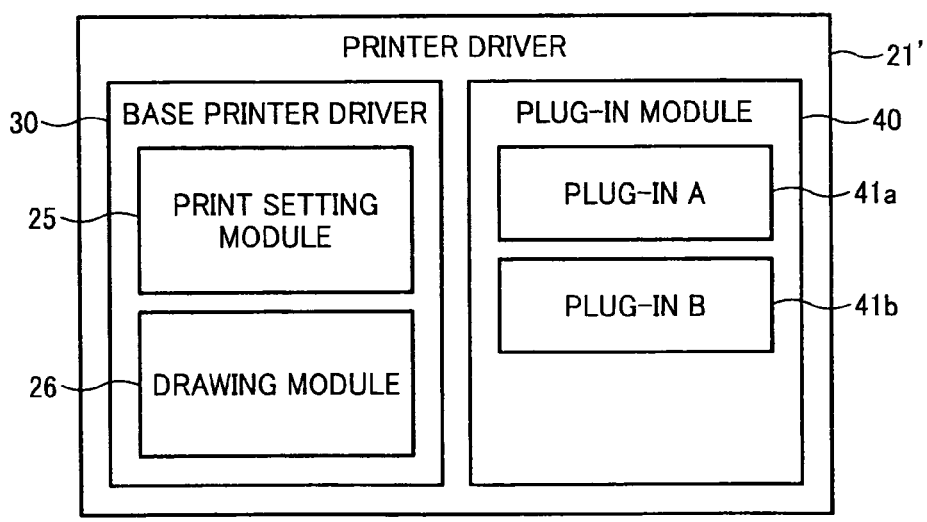
FIG. 4 is a schematic depicting an exemplary configuration of a printer driver having a plug-in function.

FIG. 4 depicts an exemplary configuration of a printer driver 21' having a plug-in function. The printer driver 21' has a base printer driver 30 that corresponds to the printer driver 21 and performs basic controls for the printer 13, and a plug-in module 40 that stores therein plug-in software for adding a function to the base printer driver 30. The base printer driver 30 has the print setting module 25 and the drawing module 26, in the same manner as the printer driver 21. The plug-in software will be hereinafter simply referred to as plug-in as appropriate.

The plug-in module 40 stores therein a plug-in for adding a function to the base printer driver 30. The plug-in module 40 can store therein a plurality of plug-ins, e.g., a plug-in 41a, a plug-in 41b, .... In the example in FIG. 4, the plug-in module 40 stores therein two plug-ins, a plug-in A (plug-in 41a) and a plug-in B (plug-in 41b), and the functions of the plug-in A and the plug-in B are added to the functions of the base printer driver 30.

Figure 5A:
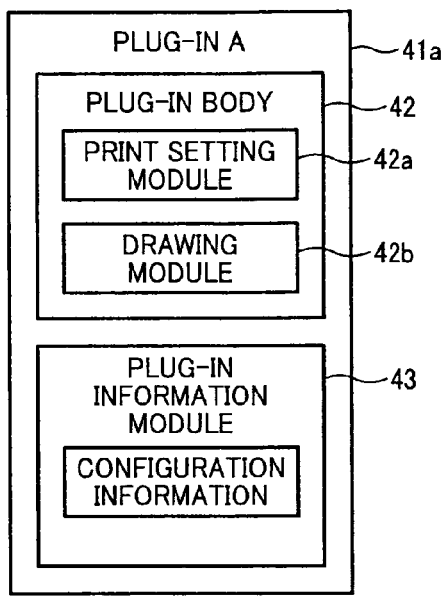
Figure 5B:
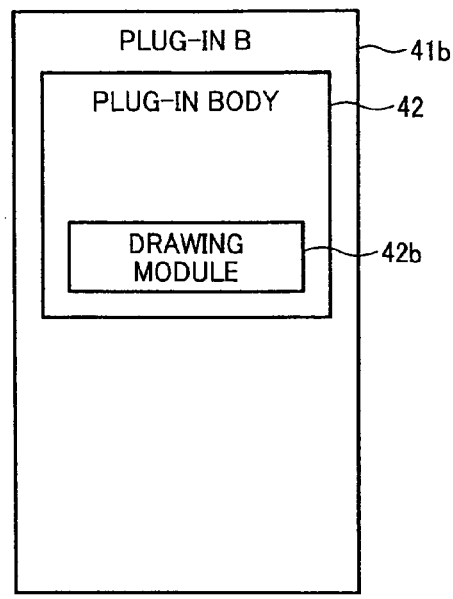

FIGS. 5A and 5B depict examples of configurations of the plug-ins. As illustrated in the example in FIG. 5A, the plug-in A (41a) has a plug-in body 42 and a plug-in information module 43. Depending on the function of a plug-in, as illustrated in the example in FIG. 5B, the plug-in information module 43 may be omitted, and only the plug-in body 42 may be included.

The plug-in body 42 has a print setting module 42a and a drawing module 42b. The print setting module 42a performs various printing-related settings based on a user operation or a command from the application software 20, in the same manner as the print setting module 25. The print setting module 42a may also include a displaying module for causing the display 111 to display thereon a setting window.

The drawing module 42b converts the data to be printed into a format printable by the printer 13 to generate the drawing data, in the same manner as the drawing module 26. This drawing data, as well as the drawing data generated by the drawing module 26 in the base printer driver 30 or by other plug-in stored in the printer driver 21', is respectively printed as a layer.

Either one of the print setting module 42a and the drawing module 42b included in the plug-in body 42 may be omitted depending on the function of the plug-in to which the plug-in body 42 belongs. For example, if the function of the plug-in is for "always printing with a stamp regardless of print settings", the plug-in body 42 may include only the drawing module 42b, and the print setting module 42a may be omitted, as illustrated in the example in FIG. 5B.

The plug-in information module 43 stores therein internal configuration information of the plug-in, or information that is referred within the plug-in. For example, the plug-in body 42 refers to the information stored in the plug-in information module 43 within the same plug-in to perform the print settings or to generate the drawing data. The plug-in information module 43 is used if the plug-in requires some settings; therefore, if the plug-in does not need to use the plug-in information module 43, the plug-in information module 43 may be kept empty or may be omitted as illustrated in the example in FIG. 5B.

The plug-in body 42 includes, for example, a library that is read and used by the base printer driver 30 as required, and an executable file that can be executed by itself. In the Windows (registered trademark) that is one of the OSes, a library is referred to as a dynamic link library (DLL), and represented by an extension ".dll". An executable file is an EXE file in the Windows (registered trademark), and represented by an extension ".exe".

The file format of the plug-in information module 43 is not especially limited, as long as the plug-in body 42 can interpret such a format. In practice, the plug-in information module 43 is a file described in a text, and in the Windows (registered trademark), for example, file formats indicated by extensions such as ".txt", ".ini", or ".xml" are used. The extension ".xml" indicates that the file is described in the Extensible Markup Language (XML), and defines each of stored information with tags.

The plug-in 41a (the plug-in A) illustrated in FIG. 5A is an example of a configuration of a plug-in for extending the functions of the base printer driver 30 so that a user is allowed to decide the print settings to generate drawing data converted into a format printable by the printer 13 based on the setting. In this plug-in, the plug-in body 42 has the print setting module 42a and the drawing module 42b. Because information unique to the plug-in is also used, the plug-in information module 43 is included as well.

The plug-in 41b (the plug-in B) illustrated in FIG. 5B is an example of a configuration of a plug-in for extending the function of the base printer driver 30 so that a print is always made with a stamp regardless of the print settings. In this scenario, because it is not necessary to perform the print settings, or to use the plug-in information, the plug-in body 42 includes only the drawing module 42b.

Embodiment of Present Invention

Figure 6:
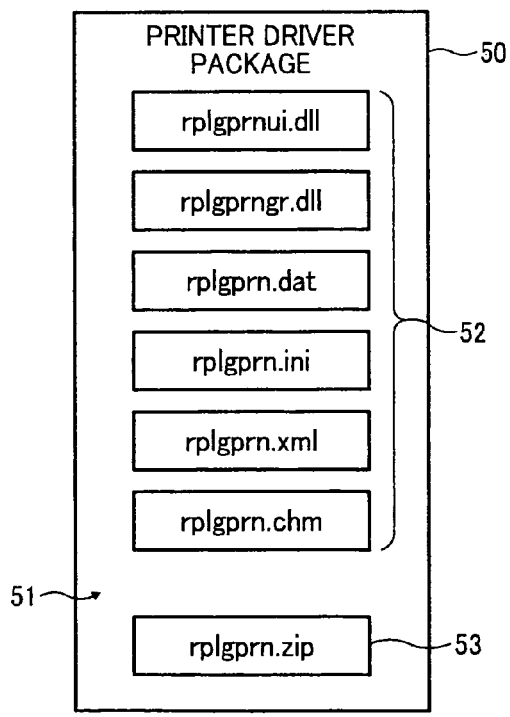
FIG. 6 is a schematic depicting an exemplary configuration of a printer driver package according to an embodiment of the present invention.

An embodiment of the present invention will now be explained. FIG. 6 depicts an exemplary configuration of a printer driver package 50 according to an embodiment of the present invention. The printer driver package 50 is stored at a predetermined directory in the host computer 11. A package herein means a structure of files that are grouped together to make up the printer driver. In other words, the printer driver package 50 stores therein a file set 51 required for operating as the printer driver.

In the embodiment, the file set 51 includes a file set 52 making up the base printer driver 30, and a plug-in storage file 53 storing therein a plug-in for adding a function to the base printer driver 30. The content of the plug-in storage file 53 is kept empty when no function is added to the base printer driver 30 by way of a plug-in.

Without limitation thereto, if no function is added to the base printer driver 30 by way of a plug-in, another file that is not a plug-in may be stored in the plug-in storage file 53.

FIG. 7 depicts an exemplary configuration of a driver information file 60 corresponding to the printer driver package 50 according to the embodiment. The driver information file 60 is associated to the corresponding printer driver package 50, and maintained in and managed by the host computer 11. The driver information file 60 is transferred to the client computer 12 together with the printer driver package 50 when the printer driver package 50 is copied to the client computer 12, and referred by an installer on the client computer 12.

In descriptions in the driver information file 60, a file name 62 of the plug-in storage file 53 ("rplgprn.zip" in the example in FIG. 7) is described in a file list section 61, together with each of the names of files belonging to the file set 52 that makes up the base printer driver 30.

Figure 8:
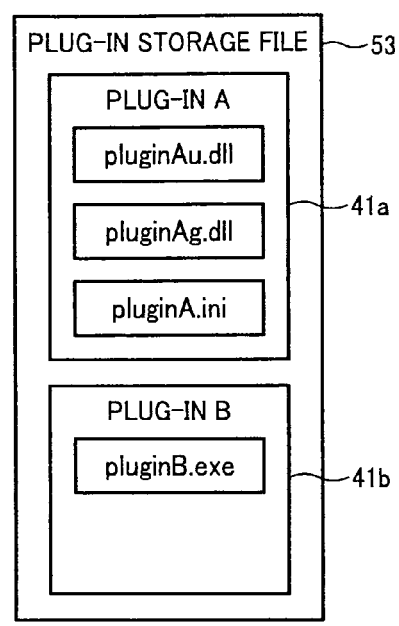
FIG. 8 is a schematic depicting an example where a plug-in is stored in a plug-in storage file.

FIG. 8 depicts an example where a plug-in is stored in the plug-in storage file 53. When a plug-in is added to the printer driver, each file making up the plug-in that is added is stored in the plug-in storage file 53 in an appropriate structure.

In the example in FIG. 8, the plug-in 41a (the plug-in A) and the plug-in 41b (the plug-in B) are stored in the plug-in storage file 53, adding the two plug-ins to the base printer driver 30. The plug-in 41a includes files "pluginAu.dll", "pluginAg.dll", and "pluginA.ini". The plug-in 41b includes a file "pluginB.exe". A directory may be created in the plug-in storage file 53 for each of the plug-ins and store therein each of these files corresponding to each of the pair of the plug-ins at the directory together, or each of the files may be stored one-dimensionally, without creating any directory.

The OS controlling an installing operation performed by the printer driver obtains the file names of the files making up the printer driver package 50 based on the descriptions in the file list section 61 of the driver information file 60, and executes installing operations based on the obtained file names.

According to the embodiment, in the initial condition where no plug-in is added to the base printer driver 30, the plug-in storage file 53 is created as a dummy in advance, and information thereof is described in the file list section 61 of the driver information file 60. A set of files making up a plug-in to be added then is stored in the plug-in storage file 53. Therefore, as described above, even if a plurality of plug-ins is added to the base printer driver 30, the descriptions in the file list section 61 do not change, and the OS recognizes the plug-in storage file 53 as one of the files that make up the printer driver package 50.

Figure 9:
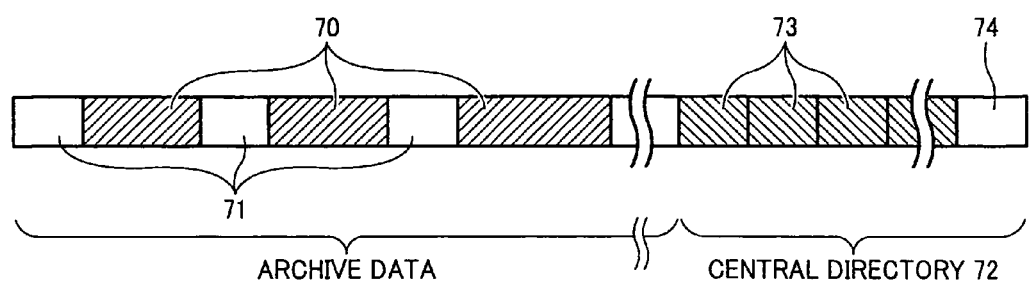
FIG. 9 is a schematic depicting an exemplary configuration of the plug-in storage file.

FIG. 9 depicts an exemplary configuration of the plug-in storage file 53. In the embodiment, a file in the ZIP format that is generally used upon handling a plurality of file data by grouping the file data into a single file is used for the plug-in storage file 53. Without limitation thereto, a file in any other format may be applied, as long as a plurality of pieces of data can be grouped into a single file.

In a ZIP file, pieces of file data 70, 70, that are to be archived are respectively appended with local file headers 71, 71, ... including file name information, information indicating compression/non-compression, and the like, and are stored sequentially from the head of the ZIP file. The file data 70, 70, ... may be compression-coded, or may not be compressed. The file data 70, 70, ... and the corresponding local file headers 71, 71, ... are referred to as archive data.

A central directory 72 is appended at the end of the archive data, in other words, at the tail of the ZIP file. The central directory 72 is definition information for the archive data, and includes file headers 73, 73, ... respectively corresponding to the local file headers 71, 71, .... In the file headers 73, 73, ..., the file names of the file data 70, 70, ... to which the corresponding local file headers 71, 71, ... are appended are described, for example. A footer 74 that is a definition of an end is appended following the central directory 72.

To read each of the file data 70, 70, ... stored in the ZIP file, the central directory 72 located at the tail of the ZIP file is accessed to begin with to read the file headers 73, 73, .... Each of the file data 70, 70, ... is then accessed based on the read file headers 73, 73, ... information. Therefore, each of the file data 70, 70, ... stored in the ZIP file can be accessed individually.

A process of taking out each the files stored in a group in the plug-in storage file 53 and having a respective original file format is referred to as an extraction or an extracting process. In the example of the ZIP file, the central directory 72 is accessed and the file headers 73, 73, ... are read to take out each of the file data 70, 70, ... in the respective original format by way of the extraction or the extracting process. If each of the file data 70, 70, ... is compression-coded, each of the file data 70, 70, ... is expanded in a corresponding method based on information such as file headers 73, 73, ....

Figure 10:
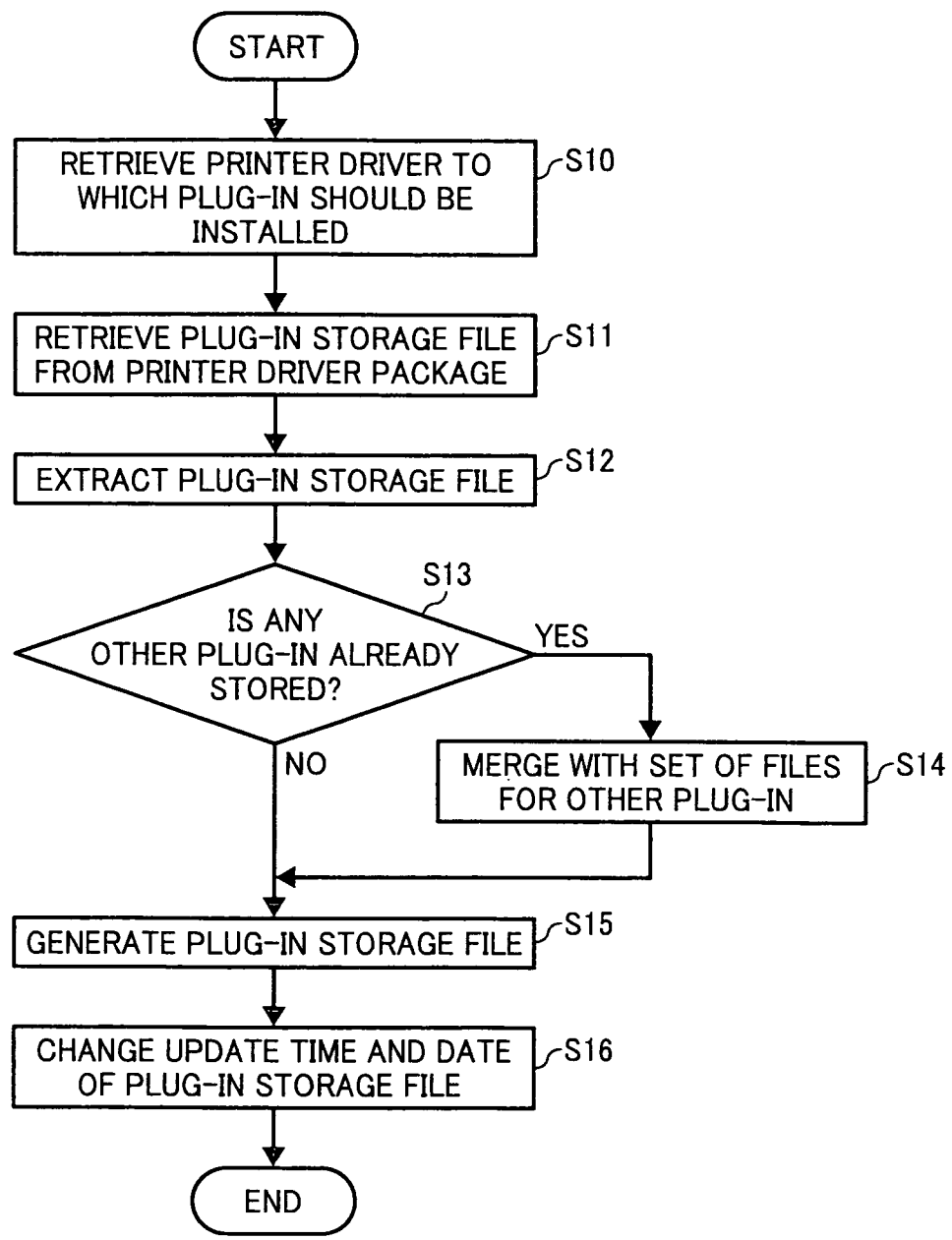
FIG. 10 is a flowchart indicating an example of a process for generating the plug-in storage file according to the embodiment.

FIG. 10 is a flowchart indicating an example of a process for generating the plug-in storage file 53 according to the embodiment. The process whose example is illustrated in FIG. 10 is executed by the CPU 101 according an installer program (hereinafter, installer) that is dedicated to a plug-in that is to be newly added. As an example, when the plug-in that is to be newly added is introduced into the host computer 11, a user would initiate the installer attached to the plug-in, to start the process illustrated by the flowchart in FIG. 10.

The installer lists up printer drivers that are installed in the OS on the host computer 11, and retrieves a printer driver to which the new plug-in should be installed (Step S10). At next Step S11, the installer refers to a directory at which the printer driver, to which the new plug-in is to be installed, is installed, and retrieves the plug-in storage file 53 in the printer driver package for the printer driver. The plug-in storage file 53 thus retrieved is extracted at Step S12.

At next Step S13, the installer checks the contents of the extracted plug-in storage file 53, and determines whether any other plug-in is already stored. When it is determined that no plug-in is stored in the plug-in storage file 53, the process proceeds to Step S15 that is to be described later. On the contrary, when it is determined that the plug-in storage file 53 already stores therein a plug-in at Step S13, the process proceeds to Step S14.

At Step S14, a set of files making up the plug-in that is to be newly installed is merged with a set of files making up the other plug-in that is taken out from the plug-in storage file 53 by way of the extracting process at Step S12. In other words, by way of this merging process, the set of files making up the plug-in that is to be newly installed is placed in parallel with the set of files making up the other plug-in that is already installed. Upon completing the merging process, the process proceeds to Step S15.

At Step S15, the plug-in storage file 53 containing the plug-in that is to be newly added is generated. In other words, when the process directly proceeds from Step S13 to Step S15, the plug-in storage file 53 containing the set of files making up the plug-in that is to be newly added is generated. On the contrary, when the process proceeds from Step S14 to Step S15, the plug-in storage file 53 containing the entire data merged at Step S14 is generated.

In the example of the ZIP file, for example, the local file header 71 is generated for each of the files to be stored in the plug-in storage file 53, and the local file header 71 and the file data 70 for each of the files are sequentially written. Upon completing writing all of the files to be stored in the plug-in storage file 53, the file headers 73, 73, ... are generated based on each of the local file headers 71, 71, ... and each of the file data 70, 70, ... and the central directory is built. The built central directory is written to the end of the archive data including each of the local file headers 71, 71, ... and each of the file data 70, 70, ..., the footer 74 is further written thereto; the plug-in storage file 53 is thus generated. The generated plug-in storage file 53, for example, overwrites the original plug-in storage file 53.

At Step S15, the file data 70, 70, ... may include the archive data that is compression-coded in a predetermined format, or may be used uncompressed to be included in the archive data.

In the embodiment, the dummy plug-in storage file 53 is created while no plug-in is added to the base printer driver 30, and information of the plug-in storage file 53 is written to the file list section 61 of the driver information file 60. Therefore, at Step S14 and Step S15, even if the files making up a new plug-in is added to the plug-in storage file 53, the descriptions in the driver information file 60 do not change.

After the plug-in storage file 53 is generated at Step S15, the process proceeds to Step S16. At Step S16, an update time and date (timestamp) of the plug-in storage file 53 generated at Step S15 is changed.

More specifically, at Step S16, the update time and date of the plug-in storage file 53 is changed to the time a little (for example, approximately one second) after the updated time and date of the plug-in storage file 53 before the extracting process is performed at Step S12. This is for avoiding a trouble upon upgrading the base printer driver 30.

In other words, depending on the update time and date of the plug-in storage file 53, there is a possibility that the update time and date of the plug-in storage file 53 is considered later than that of a printer driver of a newer version. In such a situation, a plug-in that is made available with the printer driver of the newer version ends up having the update time and date older than that of the plug-in storage file 53. Therefore, the version of the plug-in made available with the printer driver of the newer version could be determined to be older than the version of the plug-in that is currently installed, thus preventing such a plug-in from being installed.

To avoid such a trouble, in the embodiment, the update time and date of the plug-in storage file 53 is changed back to the update time and date of the original plug-in storage file 53. In practice, to avoid an unexpected error, the update time and date of the plug-in storage file 53 is changed a little later (a few seconds to a few minutes) than the update time and date of the original plug-in storage file 53, as mentioned earlier.

This example is not limited thereto, and the update time and date of the plug-in storage file 53 may be set to any time between the update time and date of the original plug-in storage file 53 and the update time and date of the printer driver of the next version. More preferably, the update time and date of the plug-in storage file 53 is changed to time that is after the update time and date of the original plug-in storage file 53, not matching such update time and date, and appearing approximately the same time as the update time and date (for example, the time a few seconds to a few minutes after the update time and date).

Figure 11:
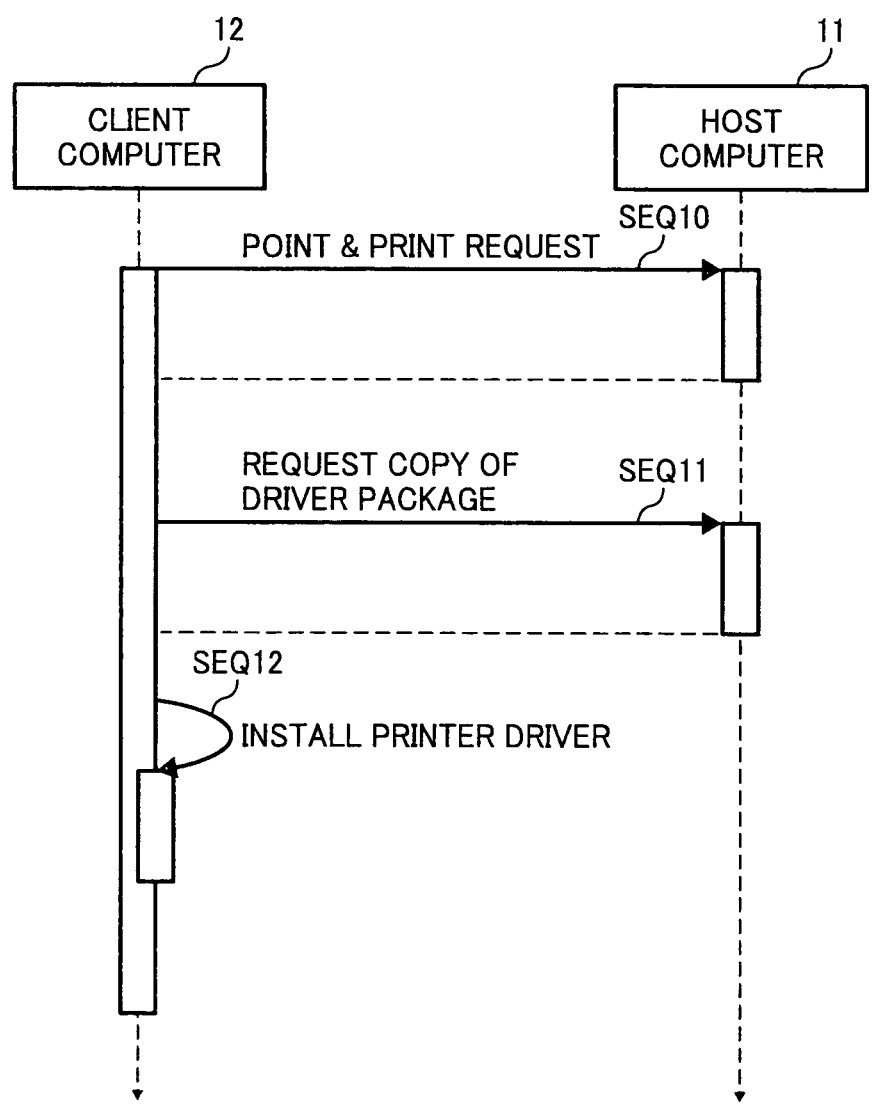
FIG. 11 is a sequence diagram indicating an exemplary process for copying and installing the printer driver package to the client computer.

FIG. 11 is a sequence diagram of a process of an example in which the printer driver package 50, for which the plug-in storage file 53 is generated in the manner explained in FIG. 10 and to which the plug-in is added, is copied and installed to the client computer 12. FIG. 11 depicts an example in which the printer driver is installed to the client computer 12 using the "Point & Print" function in the Windows (registered trademark) that is one of the OSes.

It is assumed herein that the plug-in storage file 53 storing therein a plug-in that is to be additionally installed is generated using the process explained with the flowchart of FIG. 10, and the printer driver package 50 including the plug-in storage file 53 is formed on the host computer 11 before performing the process in FIG. 11.

On the client computer 12, by way of a user operation, for example, the OS is requested to update or to install the printer driver corresponding to the printer 13 connected thereto over the network 10. In response to the request, the OS on the client computer 12 requests the host computer 11 to update the printer driver using the "Point & Print" function (SEQ10).

In response to the request, the OS on the host computer 11 performs predetermined exchanges, such as those for setting a port or for obtaining identification (ID) information of the printer 13, between the host computer 11, the printer 13, and the client computer 12, according to the "Point & Print" function. By way of such exchanges, the "Point & Print" function is made available.

Once the "Point & Print" function is made available, the client computer 12 requests the host computer 11 to copy the printer driver package 50 of the printer driver corresponding to the printer 13 to the client computer 12, according to the "Point & Print" function (SEQ11). In response to this request, the host computer 11 transmits a set of files, including the plug-in storage file 53, making up the printer driver package 50 to the client computer 12, following the descriptions in the file list section 61 of the driver information file 60, by way of the "Point & Print" function.

When the client computer 12 receives the set of files making up the printer driver package 50, the OS on the client computer 12 starts installing the set of files to the client computer 12 (SEQ12).

For example, the OS copies the files contained in the set of files making up the base printer driver 30 and the plug-in storage file 53 to predetermined directories. The installer then registers predetermined information related to the copied files to the OS.

The function of the plug-in added to the printer drive is called as appropriate, when required, such as upon executing a print. For example, when a function realized by a plug-in becomes necessary upon executing a print, the printer driver extracts the plug-in storage file 53 to take out the files making up the plug-in, and copies the same to a predetermined directory.

As explained above, according to the embodiment, the plug-in added to the printer driver can be copied to the client computer 12 using only the function included in the OS on the host computer 11.

Variation of Embodiment

A variation of the embodiment will now be explained. The process for generating the plug-in storage file 53 explained above in the embodiment using FIG. 10 is executed using the installer dedicated to the added plug-in. On the contrary, in the variation, a plug-in is installed using a general process, without using the installer dedicated to the plug-in.

In other words, the installer attached to the plug-in could have information unique to the plug-in (information about the corresponding printer driver, or information related to files making up the plug-in, for example). Therefore, as explained above in the embodiment using FIG. 10, the process of installing the plug-in can be automatically performed by initiating the installer.

On the contrary, if the installer is not used and the printer driver itself has a plug-in installing function, for example, such an installing function becomes generally applicable in the printer driver. Therefore, the information unique to the plug-in cannot be recognized, and it is difficult to execute the plug-in installing process just by initiating the printer driver.

Even in such a scenario, if the set of files making up the plug-in to be installed is placed to a location of the storage area specified by the printer driver on the host computer 11, the plug-in installing process can be performed automatically.

Figure 12:
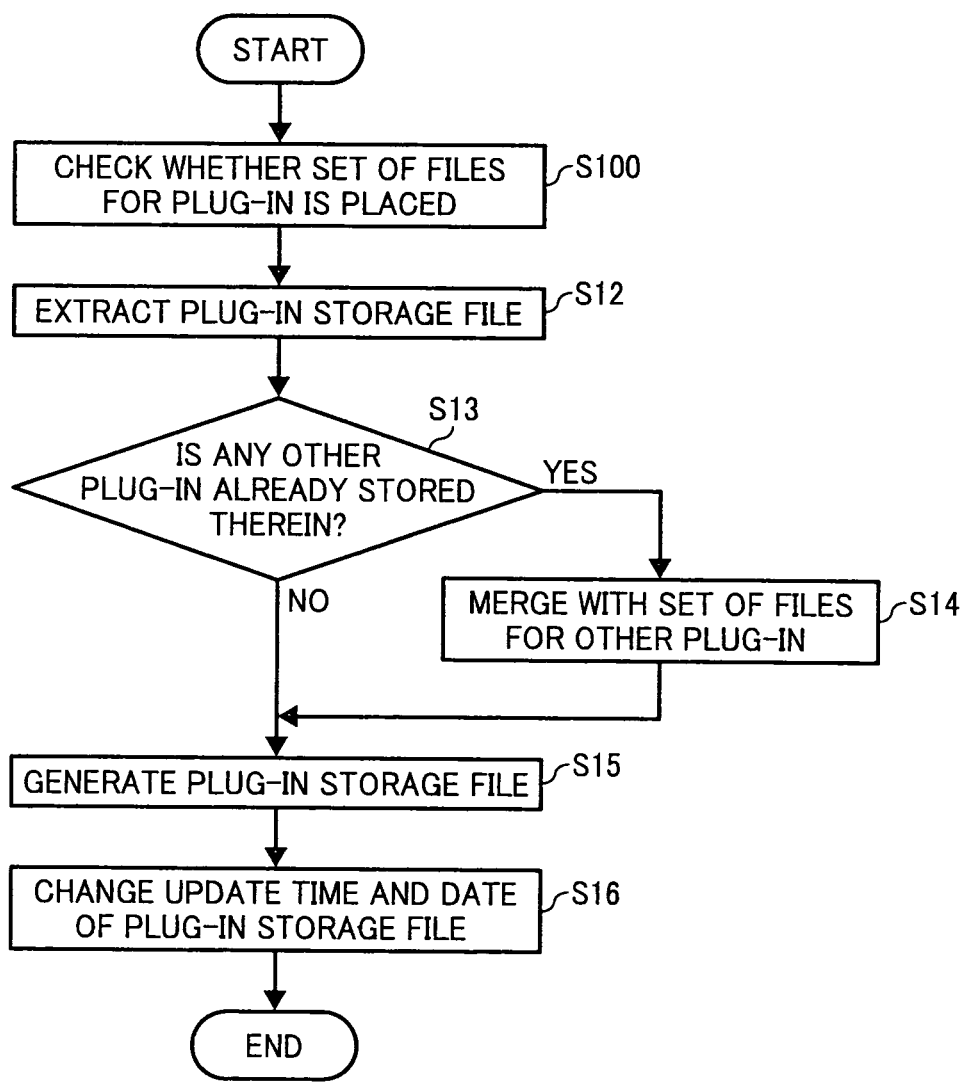
FIG. 12 is a flowchart indicating an example of a process for generating the plug-in storage file according to a variation of the embodiment.
Figure 14:
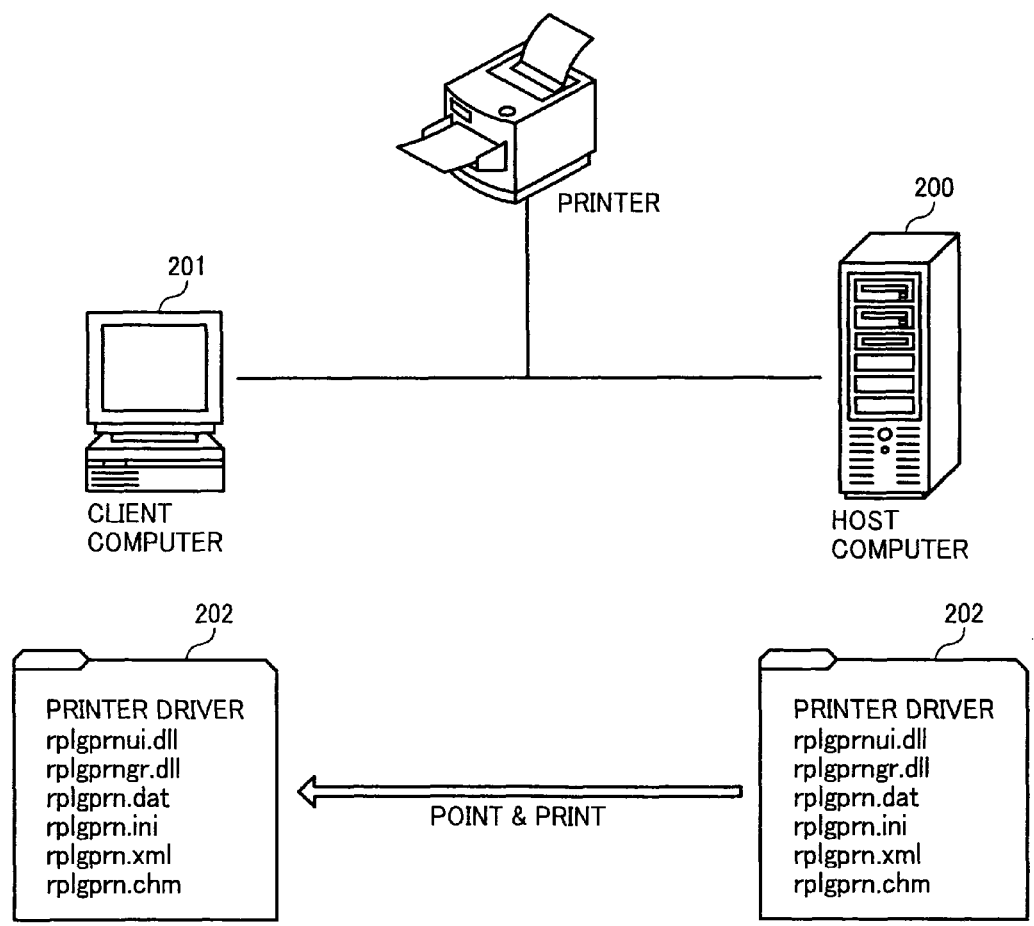
FIG. 14 is a schematic depicting how the printer driver is copied from the host computer to the client computer according to a conventional technology.

FIG. 12 is a flowchart indicating an example of a process for generating the plug-in storage file 53 according to the variation. In FIG. 12, the steps common with those in the flowchart of FIG. 10 are given with the same reference numerals, and detailed explanations thereof are omitted herein. In the process in FIG. 12, the printer driver itself has the function of the installer, and performs the plug-in installing process.

Before the process whose example is illustrated in the flowchart in FIG. 12, the set of files making up the plug-in that is to be newly added to the printer driver is placed to a location of the storage area specified by the printer driver, by way of a user operation, for example. The location in which the set of files making up the plug-in is placed is not especially limited, as long as the printer driver can refer thereto.

The printer driver checks whether the set of files making up the plug-in is placed at the location of the storage area specified by printer driver at a predetermined timing (Step S100). If not placed, the installing process is ended, for example (not illustrated).

One possible timing at which the installer checks whether the set of files making up the plug-in is placed is when some kind of a command (a Device Driver Interface (DDI) call, for example, in the example of the Windows (registered trademark) that is one of the OSes)) is issued from the OS to the printer driver. Without limitation thereto, the installer may check whether the set of files is placed at the specified location based on a user operation.

When it is confirmed that the set of files making up the plug-in is stored in the location of the storage area specified by the printer driver, the process proceeds to Step S12. Step S12 and thereafter, the process proceeds in the same manner as in that in the flowchart illustrated in FIG. 10 according to the embodiment.

In other words, the plug-in storage file 53 in the printer driver package is extracted at Step S12, and it is determined whether any other plug-in is stored in the extracted plug-in storage file 53 at Step S13. When it is determined that no plug-in is stored in the plug-in storage file 53, the process proceeds to Step S15, and the plug-in storage file 53 containing the plug-in to be newly added is generated thereat.

On the contrary, when it is determined that other plug-in is stored in the plug-in storage file 53 at Step S13, the process proceeds to Step S14. The set of files making up the plug-in that is to be newly installed is then merged with the set of files making up the other plug-in that is already stored in the plug-in storage file 53. Upon completing merging, the process proceeds to Step S15, and the plug-in storage file 53 containing the plug-in that is already added and the plug-in that is to be newly added is generated.

After the plug-in storage file 53 is generated at Step S15, the update time and date (timestamp) of the generated plug-in storage file 53 is changed at next Step S16. For example, the update time and date of the generated plug-in storage file 53 is changed to time and date that is a little, for example, one second or so, after the time and the date when the original plug-in storage file 53 is generated.

The printer driver package 50 containing the plug-in storage file 53 thus generated is copied and installed to the client computer 12 by way of the "Point & Print" function provided by the OS, for example. Because the process of installing to the client computer 12 is the same as that according to the embodiment illustrated using. FIG. 11, the explanation thereof is omitted herein.

The installing program or the printer driver executed on the host computer 11 according to the embodiment and the variation of the embodiment is recorded to and provided in the computer-readable storage medium 110 such as a CD, a flexible disk (FD), or a DVD as files in an installable or an executable format, read by way of the drive 107, and installed to the host computer 11.

Alternatively, the installing program or the printer driver executed on the host computer 11 according to the embodiment or the variation of the embodiment may also be stored on a computer connected to a network such as the Internet or a LAN, and made available for a download over the network. Moreover, the installing program or the printer driver executed on the host computer 11 according to the embodiment or the variation of the embodiment may be provided or distributed over a network such as the Internet.

Furthermore, it is possible for the installing program or the printer driver executed on the host computer 11 according to the embodiment or the variation of the embodiment to be provided incorporated in the ROM 102 in advance.

The installing program and the printer driver executed on the host computer 11 according to the embodiment or the variation of the embodiment are read from the storage medium 110 and executed by the CPU 101 to become loaded onto the main memory (the RAM 103), generating the installer and the printer driver on the main memory.

According to the present invention, a function that is added to the printer driver on the host computer can be easily added to the client computer, advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product comprising a non-transitory computer-usable medium having computer-readable program codes embodied in the medium for installing a plug-in that adds a function to a printer driver, the program codes when executed causing a computer to execute:
   storing a file that makes up a plug-in that is to be newly added to the printer driver in a plug-in storage file without changing a file name of the plug-in storage file, wherein
   a file name of a file making up a main part of the printer driver and the file name of the plug-in storage file storing therein the plug-in adding a function to the main part of the printer driver are described, as file names of files making up the printer driver, in a printer driver configuration information file in advance,
   the printer driver configuration information file is referred by an operation system to obtain the file names of the files making up the printer driver upon copying the files making up the printer driver to a different information apparatus and installing the printer driver to the different information apparatus, and
   wherein the plug-in storage file is configured as a dummy plug-in storage file storing therein no file making up a plug-in when no such a plug-in is added to the printer driver.

2. The computer program product according to claim 1, wherein, at the storing, the file making up a plug-in that is to be newly added is stored in parallel with a file making up the plug-in that is already stored in the plug-in storage file.

3. The computer program product according to claim 1, wherein, at the storing, after the file making up the plug-in that is to be newly added is stored in the plug-in storage file, update time and date of the plug-in storage file is changed to that at least between update time and date of the plug-in storage file immediately before the storing is performed and date and time at which a version of the printer driver to which the plug-in is added is upgraded next time.

4. The computer program product according to claim 3, wherein, at the storing, after the file making up the plug-in that is to be newly added is stored in the plug-in storage file, the update time and date of the plug-in storage file is changed to time after the update time and date of the plug-in storage file immediately before such storing is performed, the time being not matching such update time and date, and appearing approximately the same as such update time and date.

5. The computer program product according to claim 1, wherein, at the storing, a plurality of files making up the plug-in is stored all together in one such plug-in storage file.

6. The computer program product according to claim 1, wherein
   the program codes further causing the computer to execute:
   retrieving the printer driver to which the plug-in that is to be newly added is installed and retrieving the plug-in storage file from the file making up the printer driver thus retrieved, wherein
   at the storing, the file making up the plug-in that is to be newly added to the printer driver is stored in the plug-in storage file retrieved at the searching.

7. The computer program product according to claim 6, wherein the computer program product is made available with the plug-in that is to be newly added.

8. The computer program product according to claim 1, wherein
   the program codes further causing the computer to execute:
   obtaining the file making up the plug-in that is to be newly added from a pre-specified location of a storage area, wherein
   at the storing, the file making up the plug-in obtained at the obtaining is stored in the plug-in storage file.

9. The computer program product according to claim 8, wherein the computer program product is made available with the printer driver.

10. A system comprising:
   an information processing apparatus that installs a plug-in adding a function to a printer driver, the information processing apparatus including,
      a storage unit that stores therein a file that makes up a plug-in that is to be newly added to the printer driver in a plug-in storage file without changing a file name of the plug-in storage file, wherein
      a file name of a file making up a main part of the printer driver and the file name of the plug-in storage file storing therein a plug-in adding a function to the main part of the printer driver are described, as file names of the files making up the printer driver, in a printer driver configuration information file in advance,
      the printer driver configuration information file is referred by an operation system to obtain the file name of the file making up the printer driver upon copying the file making up the printer driver to a different information apparatus and installing the printer driver to the different information apparatus, and
      the plug-in storage file is configured as a dummy plug-in storage file storing therein no file making up a plug-in when no such a plug-in is added to the printer driver; and
   a printer that prints out print data sent from the information processing apparatus.

* * * * *